United States Patent
Hunt

(10) Patent No.: US 11,683,623 B2
(45) Date of Patent: Jun. 20, 2023

(54) DEVICE COMPRISING SENSOR-ACTIVATED DISPENSING AND AUDITORY TONE

(71) Applicant: Linda Hunt, Durham, NC (US)

(72) Inventor: Linda Hunt, Durham, NC (US)

(*) Notice: Subject to any disclaimer, the term of this patent is extended or adjusted under 35 U.S.C. 154(b) by 316 days.

(21) Appl. No.: 16/890,606

(22) Filed: Jun. 2, 2020

(65) Prior Publication Data

US 2020/0404405 A1 Dec. 24, 2020

Related U.S. Application Data

(60) Provisional application No. 62/921,502, filed on Jun. 24, 2019.

(51) Int. Cl.
  *G06F 3/16* (2006.01)
  *H04R 1/02* (2006.01)
  *A47K 5/12* (2006.01)

(52) U.S. Cl.
  CPC ........... *H04R 1/028* (2013.01); *A47K 5/1217* (2013.01); *G06F 3/165* (2013.01)

(58) Field of Classification Search
  CPC ........ H04R 1/028; A47K 5/1217; G06F 3/165
  See application file for complete search history.

(56) References Cited

U.S. PATENT DOCUMENTS

| | | | | |
|---|---|---|---|---|
| 6,065,639 A * | 5/2000 | Maddox | ............... | A47K 5/1202 222/638 |
| 7,782,214 B1 * | 8/2010 | Lynn | ................... | A47K 5/1217 340/572.1 |
| 8,955,719 B2 * | 2/2015 | Li | ............... | B67D 7/08 222/190 |
| 9,117,361 B1 * | 8/2015 | Hennigan | ............ | G08B 21/245 |
| 10,643,454 B1 * | 5/2020 | Santamore | .............. | G01S 15/04 |
| 2006/0067546 A1 * | 3/2006 | Lewis | .................. | G08B 21/245 381/124 |
| 2006/0213924 A1 * | 9/2006 | Ophardt | ................... | A47K 5/12 222/52 |
| 2006/0231568 A1 * | 10/2006 | Lynn | .................... | A47K 5/1202 222/638 |
| 2006/0273915 A1 * | 12/2006 | Snodgrass | ............ | G08B 21/245 222/52 |
| 2007/0020212 A1 * | 1/2007 | Bernal | ................. | G08B 21/245 424/70.1 |
| 2008/0185396 A1 * | 8/2008 | Yang | .................... | A47K 5/1217 222/644 |
| 2009/0140004 A1 * | 6/2009 | Scorgie | ................ | A47K 5/1217 222/638 |

(Continued)

*Primary Examiner* — Joseph Saunders, Jr.
(74) *Attorney, Agent, or Firm* — Ashley D. Johnson; Dogwood Patent and Trademark Law

(57) ABSTRACT

The presently disclosed subject matter is generally directed to a dispensing device that enables sensor-activated dispensing and playing of an auditory tone. The disclosed dispenser includes a housing comprising an internal reservoir that retains the product to be dispensed. The dispenser further includes one or more sensors that act as a motion detector to release a predetermined amount of product from the internal reservoir. The motion sensor further triggers the release of one or more predetermined auditory tones to be played from a speaker configured in the lower portion of the dispenser. Accordingly, users are encouraged to frequently use the dispenser, such as for hand washing and other activities.

18 Claims, 12 Drawing Sheets

(56) References Cited

U.S. PATENT DOCUMENTS

| | | | | |
|---|---|---|---|---|
| 2009/0166378 | A1* | 7/2009 | Stilley | B05B 1/002 |
| | | | | 222/113 |
| 2009/0294471 | A1* | 12/2009 | Paige | G04G 13/026 |
| | | | | 222/646 |
| 2011/0234407 | A1* | 9/2011 | Harris | G08B 21/245 |
| | | | | 340/573.1 |
| 2012/0111884 | A1* | 5/2012 | Choi | A61B 90/80 |
| | | | | 222/642 |
| 2013/0200097 | A1* | 8/2013 | Yang | H05K 13/00 |
| | | | | 222/52 |
| 2015/0170502 | A1* | 6/2015 | Harris | G08B 21/245 |
| | | | | 340/573.1 |

* cited by examiner

DEVICE COMPRISING SENSOR-ACTIVATED DISPENSING AND AUDITORY TONE

CROSS-REFERENCE TO RELATED APPLICATIONS

This application claims priority to U.S. Provisional Application No. 62/921,502 filed Jun. 24, 2019, the entire contents of which are hereby incorporated by reference herein.

TECHNICAL FIELD

The presently disclosed subject matter is generally directed to a dispensing device that enables sensor-activated dispensing and initiation of an auditory tone (e.g., music, quotes, health tips).

BACKGROUND

Frequent hand washing is recommended to destroy many of the germs that cause viruses, colds, and other diseases. Particularly, the Center for Disease Control (CDC) recommends that people wash their hands with warm water and soap for at least 20 seconds. However, many children and adults wash their hands for only a few seconds or merely rinse their hands under water without using soap. With the onset of Coronavirus, the common cold, and season influenza virus, proper hand washing techniques are especially important to stop the spread of harmful illnesses. Traditional dispensers typically require the user to press or pull an area of the dispenser to actuate the dispensing function, which can spread germs and be unsanitary. It would therefore be beneficial to provide a touchless dispenser that encourages use, such as in adults, children, and the elderly. It would further be beneficial if the dispenser was aesthetically pleasing and entertaining, thereby enticing the user to wash their hands for the recommended 20 seconds.

SUMMARY

The presently disclosed subject matter is directed to a dispenser comprising a housing defined by an inner reservoir and a dispensing outlet. The dispenser further includes a base operatively connected to a bottom surface of the housing, wherein the base comprises at least one speaker capable of transmitting an auditory tone. The dispenser comprises a sensor capable of detecting the presence of a user, wherein the sensor is configured to dispense a predetermined amount of product housed within the inner reservoir and simultaneously transmit an auditory tone from the speaker when the presence of a user is detected.

In some embodiments, the auditory tone is selected from music, quotes, Scripture, jokes, short stories, passages from the King James Bible, or combinations thereof.

In some embodiments, the sensor is configured adjacent to the dispensing outlet.

In some embodiments, a top surface of the housing includes an access operably connected to the inner reservoir.

In some embodiments, the sensor is selected from a motion sensor, infrared sensor, or heat sensor.

In some embodiments, the speakers are positioned beneath the base.

In some embodiments, the dispenser further comprises a microcontroller, a motor controller, a motor pump, and a digital tone module.

In some embodiments, the digital music module is an MP3 module.

In some embodiments, the microcontroller is configured to simultaneously send signals to the motor controller and the digital tone module.

In some embodiments, the motor controller activates the motor to drive the pump to dispense a product housed within the reservoir.

In some embodiments, the digital tone module is configured to play a random audio tone when the sensor is triggered.

In some embodiments, the digital audio tone is stored on a removable micro-SD card.

In some embodiments, the dispenser further comprises an audio amplifier.

In some embodiments, the presently disclosed subject matter is directed to a method of simultaneously dispensing a product and transmitting an auditory tone from the disclosed upon triggering of the dispenser sensor. Particularly, the method comprises positioning an object adjacent to the sensor of the disclosed dispenser to trigger the sensor; dispensing a pre-determined amount of product from the outlet; and simultaneously emitting an auditory tone from the at least one speaker; wherein the auditory tone lasts for a pre-determined amount of time.

In some embodiments, the auditory tone is randomly selected from a number of different auditory tones.

DETAILED DESCRIPTION

Figure 1:
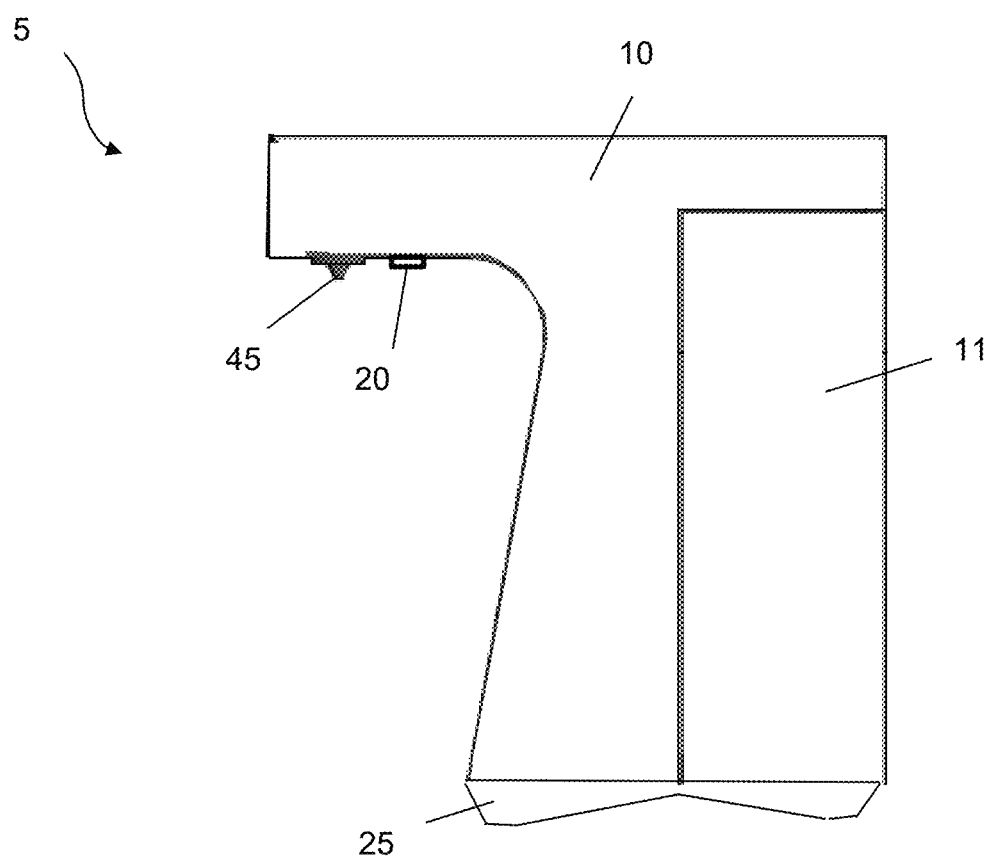
FIG. 1 is a side plan view of a dispenser in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a dispensing device that enables sensor-activated dispensing and playing of an auditory tone. The term "dispenser" refers to a container defining a reservoir housing a quantity of fluid or pumpable material typically sufficient for a number of repeated applications by a user. As shown in FIG. 1, dispenser 5 includes housing 10 comprising internal reservoir 11 that houses a product to be dispensed. The dispenser further includes sensor 20 that is triggered to release a predetermined amount of product from the internal reservoir via outlet 45. The sensor further triggers the release of one or more predetermined auditory tones to be played from base 25. The predetermined auditory tones can be selected from music, quotes, Scripture, jokes, passages from the King James Bible, short stories, and the like. Accordingly, users are encouraged to frequently use dispenser 5, such as for hand washing and other activities.

Figure 2A:
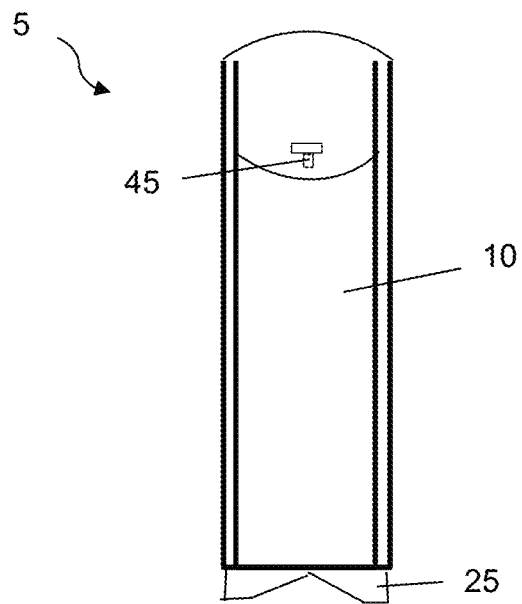
FIG. 2a is a front plan view of a dispenser in accordance with some embodiments of the presently disclosed subject matter.
Figure 2B:
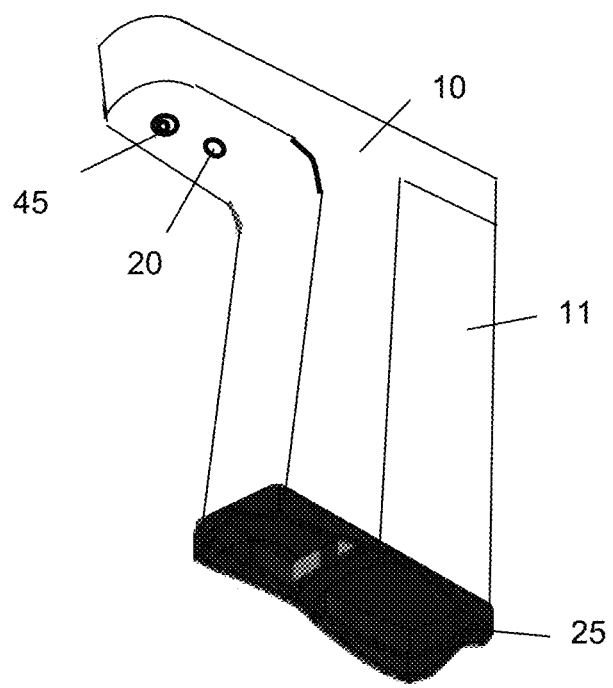
FIG. 2b is a perspective view of a dispenser in accordance with some embodiments of the presently disclosed subject matter.

As shown in FIGS. 2a and 2b, the device includes housing 10, reservoir 11, and base 25. In some embodiments, the main body, reservoir, and base are formed as a single unit and cannot be separated from each other. In other embodiments, the main body, base, and reservoir are capable of releasable attachment to each other using standard techniques. For example, the various members of the dispenser can attach and detach using a snap fit connection, pressure fit connection, screw threads, magnets, mechanical elements (e.g., screws, bolts, clips), and the like. In this way, the various components can be cleaned or serviced as needed.

Housing 10 can be shaped as a curved body with a downward facing outlet 45 that ensures when product is dispensed, it is done so with little risk of getting on the operator's clothing. It should be appreciated that the dispenser can take any shape and is not limited to the shape set out in the Figures. For example, dispenser 5 can be configured to correspond to a particular theme, such as that of an animal, event, person, cartoon character, and the like. The housing can further include any desired colors and/or patterns as desired.

Figure 3A:
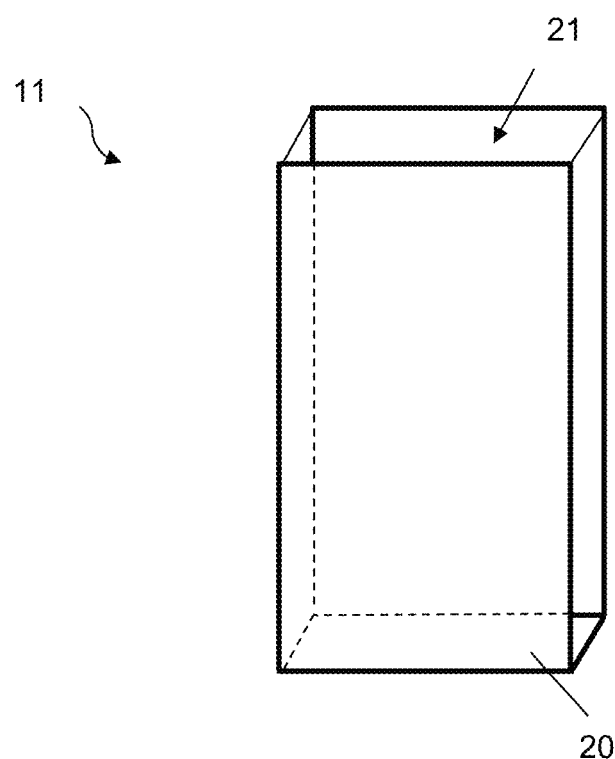
FIG. 3a is a perspective view of a dispenser reservoir in accordance with some embodiments of the presently disclosed subject matter.

As described, housing 10 comprises internal reservoir 11 for containing a volume of product to be dispensed. The term "reservoir" as used herein refers to any structure having a closed end and an open end that can be used for storing and handling a product to be dispensed. FIG. 3a illustrates one embodiment of reservoir 11. The shape of the reservoir is not limited so long as includes a sufficient volume to house a product to be dispensed (e.g., liquid hand soap). Reservoir 11 includes closed end 20 and open end 21 configured to allow a desired amount of product to be added.

Figure 3B:
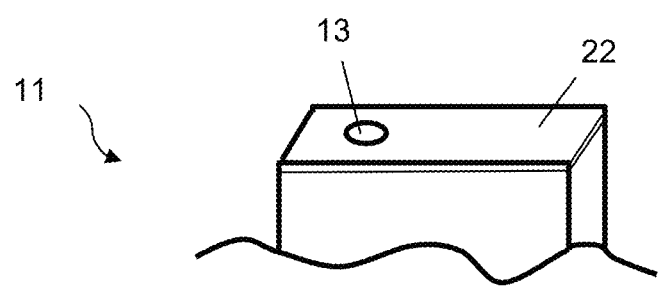
FIG. 3b is a fragmentary view of a dispenser reservoir comprising a lid in accordance with some embodiments of the presently disclosed subject matter.

In some embodiments, the open end of the reservoir can include lid 22 (or any other closure) configured to form a seal at the top of the reservoir for maintaining the product within the reservoir, as shown in FIG. 3*b*. The term "lid" refers to any closure that can be permanently or releasably attached to the open end (top end) of the reservoir. Optionally, the lid can include access 13 to allow a portion of the product to be retrieved. The access can include an aperture, port, valve, etc. The reservoir can therefore include an opening at the top edge to allow product to travel from the reservoir to the outlet for dispensing, as described in more detail below. However, it should be appreciated that lid 22 is optional.

Internal reservoir 11 houses a volume of product to be dispensed. Product 16 can include any of a wide variety of dispensable products, such as (but not limited to) personal care products (e.g., soap, dishwashing detergent, laundry detergent, lotion, sunscreen, toothpaste, cleaners, polishing agents, shampoo, air freshener, conditioner, hair gel, hair cream, hair oil, and the like) and/or food products (e.g., sour cream, mayonnaise, mustard, ketchup, relish, and the like). In some embodiments, product 16 can include any pumpable product.

Figure 3C:
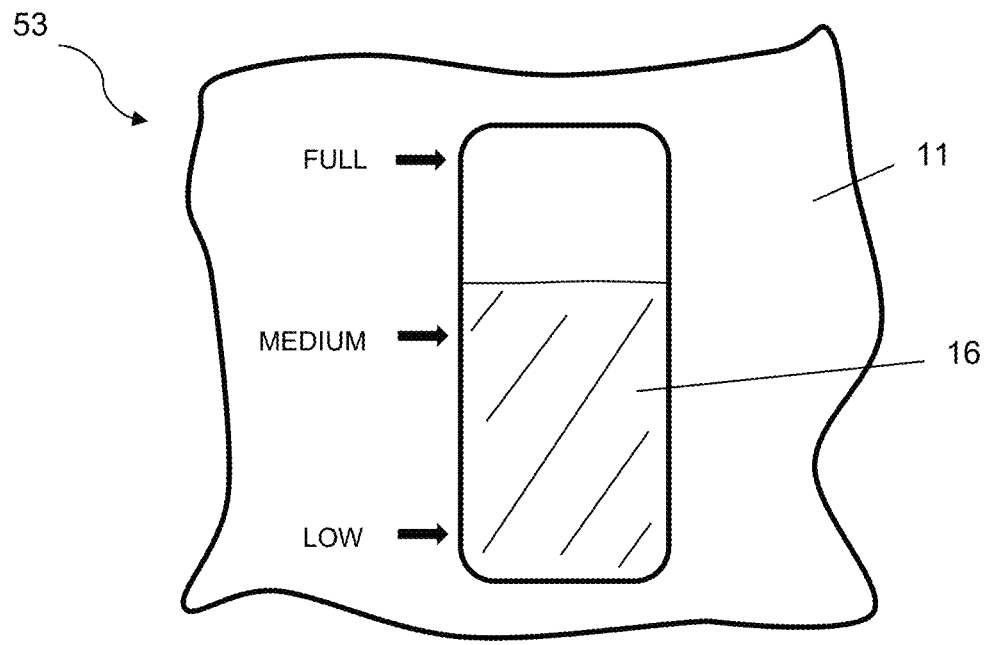
FIG. 3c is a fragmentary view of a reservoir window in accordance with some embodiments of the presently disclosed subject matter.

As shown in FIG. 3*c*, the reservoir optionally includes window 53 that allows the user to determine the level of product 16 remaining to be dispensed. The window can include a portion of transparent or semi-transparent material that allows the user to view product 16 to determine whether the reservoir needs to be refilled.

Housing 10, base 25, and reservoir 11 can have any desired cross-sectional shape. For example, these elements can have a round, oval, square, rectangular, triangular, pentagonal, hexagonal, abstract, etc. shape. Any shape can be used.

Figure 4A:
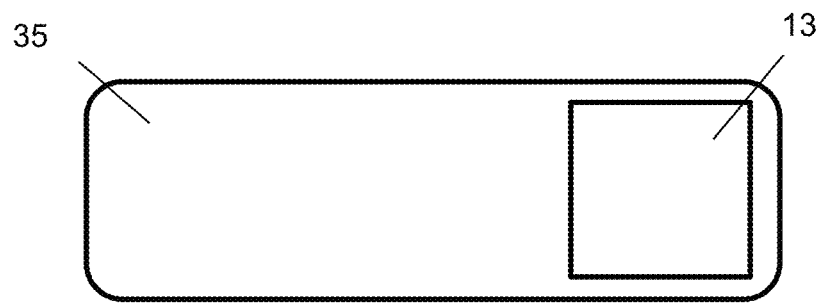
FIG. 4a is a top plan view of a dispenser in accordance with some embodiments of the presently disclosed subject matter.
Figure 4B:
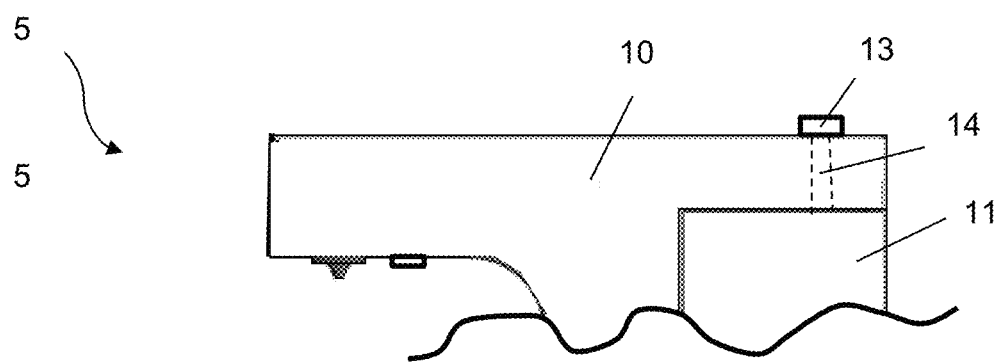
FIG. 4b is a fragmentary side plan view of a dispenser in accordance with some embodiments of the presently disclosed subject matter.

FIG. 4*a* illustrates one embodiment of the top face of the dispenser. In some embodiments, a portion of top face 35 can be removed or opened to access the reservoir, such as to add a desired amount of product 16. Thus, the top face can include door 13, which can be configured as a lid, plug, spout, aperture, cap, and the like. The term "door" thus broadly includes any element that allows a user to access the reservoir. In these embodiments, the door is releasably attached to top face 35 using any known mechanism. For example, snap-fit, pressure-fit, hinge, magnets, hook and loop closure, clips, snaps, bolts, screws, and the like can be used. In such embodiments, the door is operably connected to internal channel 14 to allow a user to deposit product 16 into the reservoir, as shown in FIG. 4*b*. The term "channel" refers to any pathway that allows a user to deposit product 16 in reservoir 11, such as (but not limited to) tubing, conduit, pipe, or any other structure that can contain and/or propagate product 16. Further, door 13 can be used to access the interior of the dispenser, such as for repair and maintenance. Advantageously, the door can be removed or closed as desired by the user to prevent dirt, moisture, etc. from entering the dispenser.

Figure 4C:
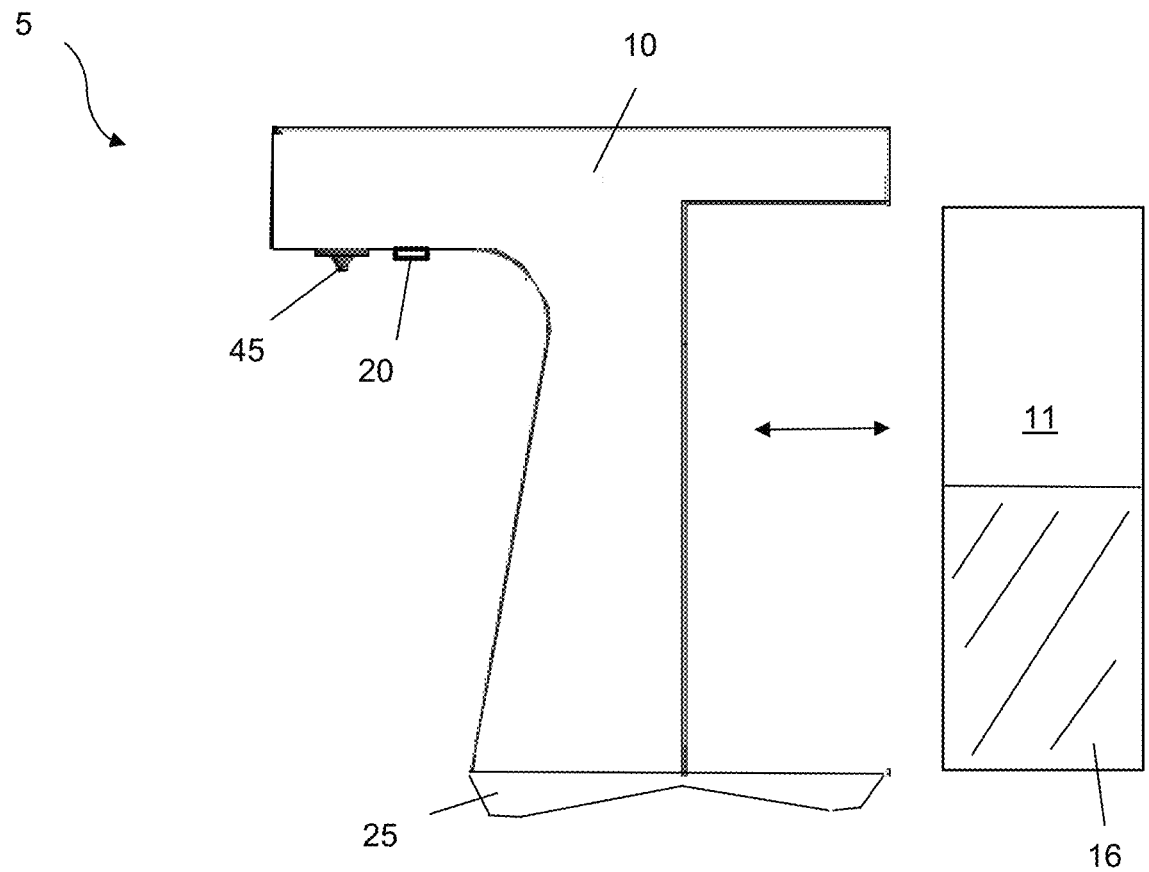
FIG. 4c is a side plan view of a dispenser with a removable reservoir in accordance with some embodiments of the presently disclosed subject matter.

In some embodiments, the reservoir can be removed from the dispenser, such as to replace product 16, as shown in FIG. 4*c*. Particularly, the user can apply pressure to remove the reservoir to refill with a desired amount of product 16. The reservoir can be removably attached to the housing using any known mechanism, such as a snap-fit closure, pressure fit closure, magnets, clips, mechanical elements (screws, bolts, and the like), hook-and-loop closure, etc.

Figure 5A:
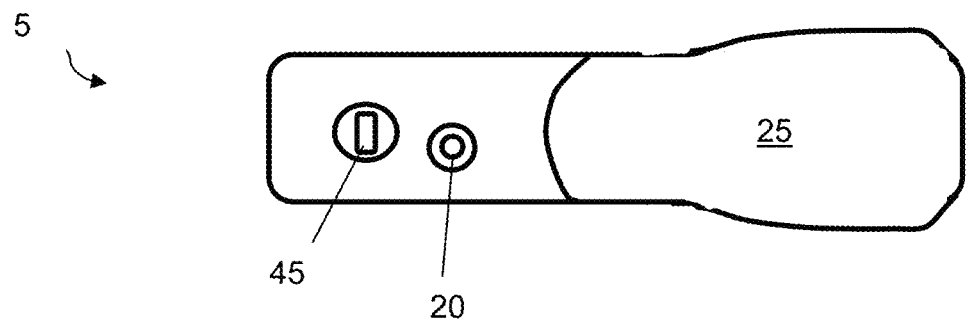
FIG. 5a is a bottom plan view of a dispenser in accordance with some embodiments of the presently disclosed subject matter.

FIG. 5*a* is a bottom plan view of dispenser 5 illustrating one embodiment of outlet 45 and sensor 20. As set forth above, product 16 exits the internal reservoir via outlet 45, such as into a user's hands or a utensil (e.g., cup). Outlet 45 can include any known element, such as a spout, nozzle, spray device, and the like. Thus, any type of outlet can be used. For example, the size of outlet 45 can be selected to provide the appropriate flow rate and/or resistance against flow of product 16 from the reservoir. In some embodiments, the outlet can be disposed at a location on the lower face of the top portion of the housing to make it more convenient for a user to place their hand under the outlet. However, the location of the outlet is not limited.

In some embodiments, outlet 45 can be disposed to extend outwardly from the periphery defined by base 25. As such, if a user misses product (e.g., soap) dispensed from the outlet, the dropped product will not strike on any portion of the housing. Accordingly, the dispenser does not become soiled from dripping product.

As shown, the dispenser also includes sensor 20 that functions to actuate the pump to dispense product 15. The term "sensor" refers to any element capable of detecting a change of state. In some embodiments, sensor 20 can be motion sensor, detecting motion. In other embodiments, sensor 20 is an infrared sensor that detects the presence of a user's hand. Thus, sensor 20 is configured to sense a user's hand or body part to activate the product dispensing sequence described below. However, sensor 20 is not limited and can include any known type of sensor (e.g., heat-sensing, noise-sensing, and the like).

In some embodiments, sensor 20 can include a "trip light" or "interrupt" type sensor. For example, the sensor can include a light emitting portion and a light receiving portion. As such, a beam of light can be emitted from the light emitting portion and received by the light receiving portion. Sensor 20 can be configured to emit a trigger signal when the light beam is blocked, such as when a body is disposed in the path of the beam of light. For example, if the light receiving portion does not receive the light emitted from the light emitting portion, then the sensor can emit a trigger signal.

Figure 5B:
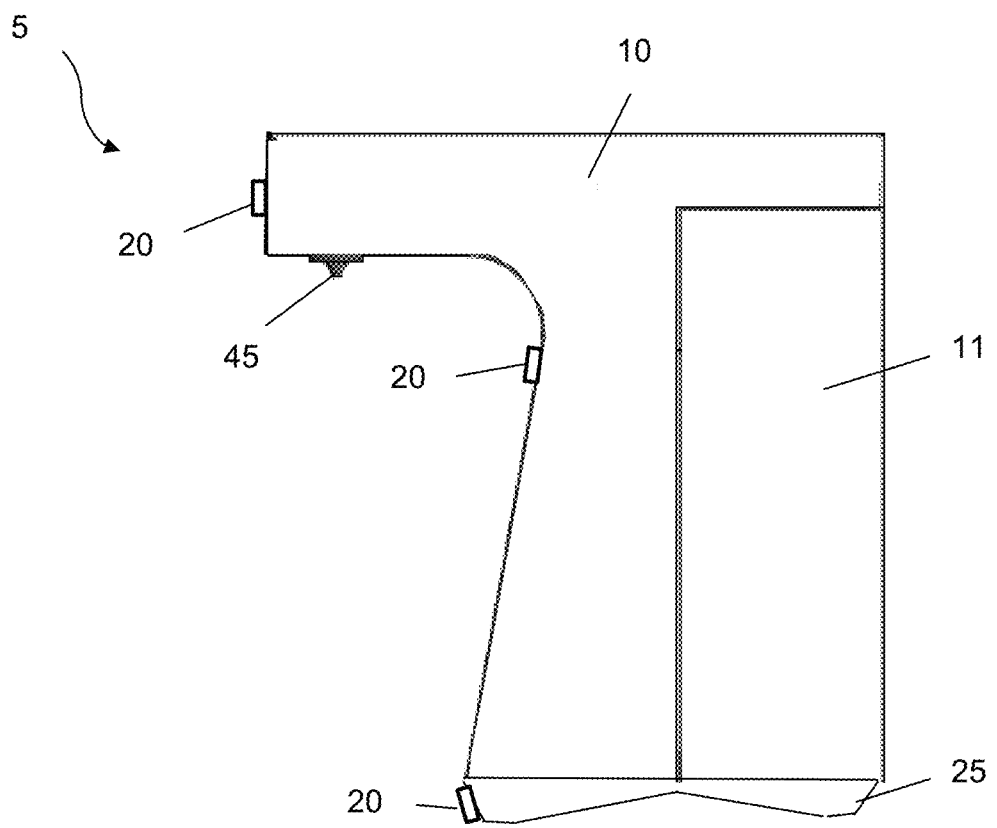
FIG. 5b is a side plan view of a dispenser comprising a plurality of sensors in accordance with some embodiments of the presently disclosed subject matter.

Sensor 20 can be positioned on any location of housing 10. For example, the sensor can be positioned adjacent to the outlet (e.g., on the same surface and/or the same plane), as shown in FIG. 5*a*. In some embodiments, the sensor can be positioned about 0.1-1 inches from the outlet (e.g., at least/no more than about 0.1, 0.2, 0.3, 0.4, 0.5, 0.6, 0.7, 0.8, 0.9, or 1 inch) to ensure that the sensor is triggered when the user positions his hands under the outlet. However, the location of sensor 20 is not limited and can be positioned on any surface of the device. For example, FIG. 5*b* illustrates one embodiment of dispenser 5 comprising sensors positioned on the housing and base.

Figure 6:
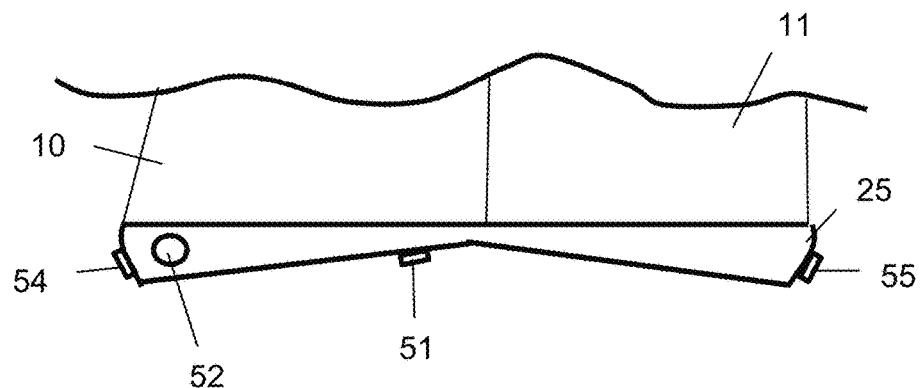
FIG. 6 is a fragmentary side view of a dispenser base in accordance with some embodiments of the presently disclosed subject matter.
Figure 7:
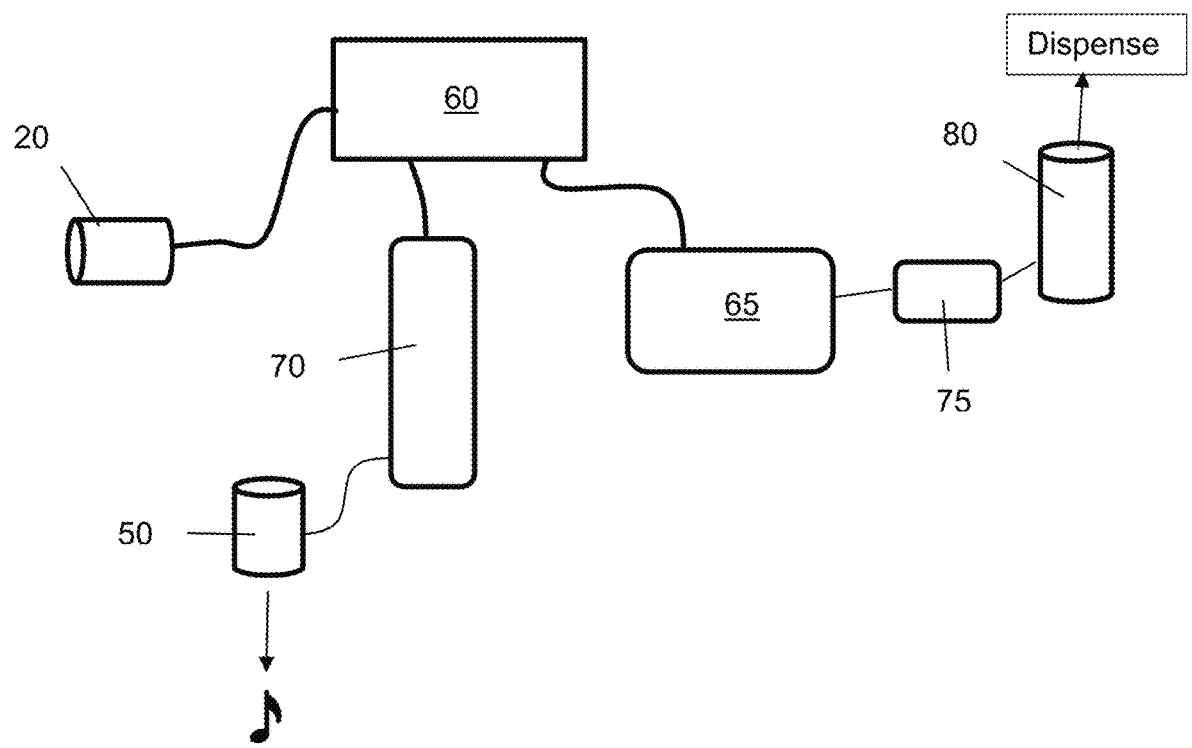
FIG. 7 is a schematic illustrating the mechanics of how product is dispensed and an auditory tone is played in accordance with some embodiments of the presently disclosed subject matter.

Housing 10 further includes base 25 configured as the lower unit of the dispenser. Base 25 provides support for the dispenser and houses one or more speakers as illustrated in FIG. 6. The term "speakers" broadly refers to an apparatus for converting electrical audio frequency signal (e.g., music or speech) to an audible signal. The speakers enable one or more auditory tones to be broadcast when product is dispensed. Base 25 can include any desired number of speakers. For example, the base can include 1-10 speakers (e.g., 1, 2, 3, 4, 5, 6, 7, 8, 9, or 10). Further, the speakers can be positioned on any surface of the base, such as underside speaker 51 positioned beneath the base, side speaker 52 positioned on the left and/or right side of the base, front speaker 54 positioned on a front face of the base, and/or rear speaker 55 positioned on a rear surface of the base. Thus, speaker 50 can be positioned at or adjacent to the front face of the dispenser, towards the user when the dispenser is in use. However, the location of the speaker is not limited. Further, each speaker can be configured in any desired shape or size.

The term "auditory tone" can include any desired sound, such as (but not limited to) music, quotes, inspirational tones, Scripture, passages from the King James Bible, short stories, recipes, health tips, and the like. In some embodiments, the same auditory tone is repeated each time the sensor is activated. Alternatively, several different auditory tones can be broadcast. For example, the dispenser can cycle through about 1-20 different tones (e.g., at least/no more than about 1, 2, 3, 4, 5, 6, 7, 8, 9, 10, 11, 12, 13, 14, 15, 16, 17, 18, 19, or 20). In some embodiments, the auditory tone can be randomly selected from a set group of tones.

Base 25 can have any desired size and/or shape so long as it supports housing 10 and reservoir 11. Particularly, the base is designed to support the dispenser on a generally flat surface, such as those normally found on a countertop in a bathroom or a kitchen.

In use, a user deposits his hands or an appliance (a cup, dish, spray bottle) under dispenser outlet 45, triggering one or more sensors 20. The sensor activates both dispensing of a pre-determined amount of product 16 from reservoir 11 and initiation of the playing of an auditory tone from speaker 50. To effectuate dispensing and the playing of the auditory sound, the dispenser includes a microcontroller, a motor controller, a motor pump, an MP3 module, and/or an audio amplifier. Specifically, when sensor 20 detects an object (e.g., a user's hands) it sends a signal to microcontroller 60, which acts as the brains of the dispenser. The term "microcontroller" refers to a device that minimally includes a processor logic (e.g., microprocessor), memory, and inputs and outputs that are adapted to execute instructions based on information stored in memory either within the microcontroller or external to the microcontroller. Optionally, the microcontroller can include any necessary timers or clocks.

The microcontroller receives the signal from sensor 20 and sends a set of signals to motor controller 65 and MP3 module 70 to allow these components to begin performing their own set of functions. In some embodiments, the set of signals are sent simultaneously to the motor controller and the MP3 module. Alternatively, the signal can first be sent to the MP3 module and then to the motor controller (or vice vera).

Figure 8:
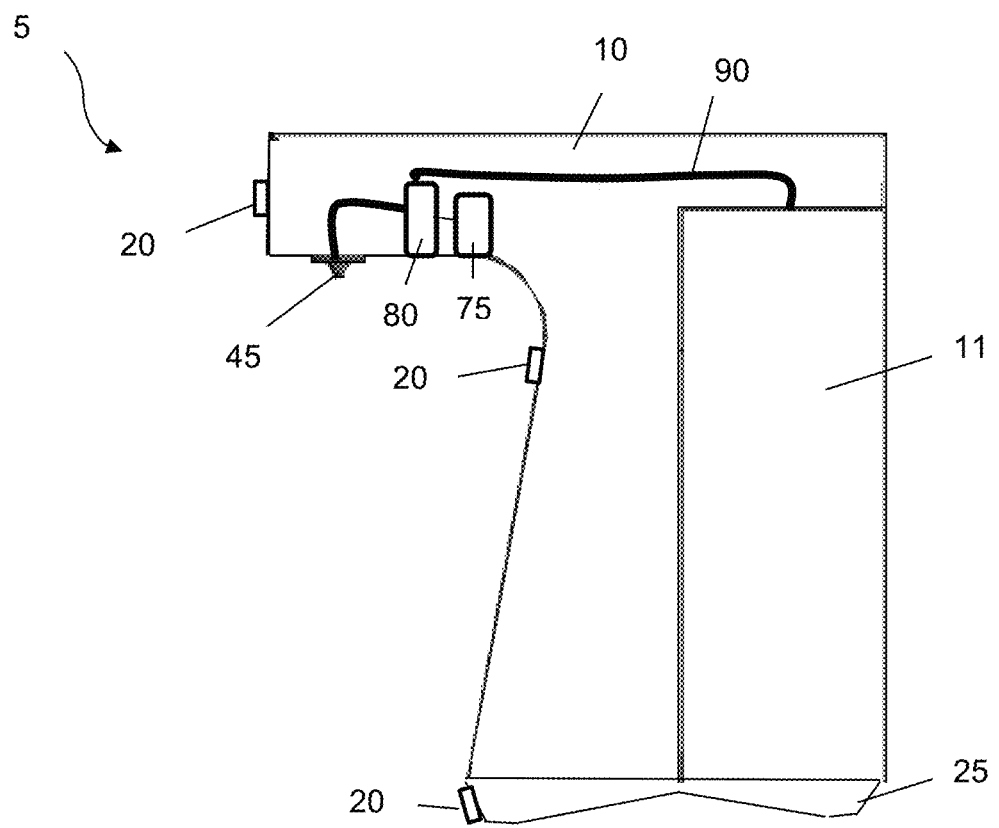
FIG. 8 is a side plan view illustrating a motor and pump assembly in accordance with some embodiments of the presently disclosed subject matter.

The term "motor controller" refers to a device that includes a processor used to control a motor. When motor controller 65 receives a signal from microcontroller 60 telling it to engage, the motor controller then activates motor 75 that drives pump 80. When the pump is activated via the motor (e.g., the motor turning), product 16 will begin being pulled from reservoir 11 and dispensed via outlet 45. For example, as shown in FIG. 8, product 16 can travel from the reservoir via conduit 90 to exit the dispenser at outlet 45. The term "conduit" broadly refers to any of a wide variety of piping or tubing through which a fluid passes. In some embodiments, the conduit can be configured as hollow tubing, although any type or diameter of conduit can be used (e.g., pipe, hose, nozzle, capillary, sleeve, and the like). The conduit can be flexible (e.g., capable of bending), allowing the dispenser to have a variety of different shapes. As shown, the conduit connects with reservoir 11 to allow pump 80 to drive movement of product 16 from the reservoir to the dispensing outlet.

The term "pump" as used herein broadly refers to any device, mechanism, or other structure that causes the movement of a product by the application of suction or pressure. Any type of pump can be used, such as (but not limited to) a pulsatile pump, gear pump, diaphragm pump, centrifugal pump, gravity pump, direct lift pump, displacement pump, screw pump, velocity pump, and/or bellow pump. Please see, for example, U.S. Pat. Nos. 6,203,288; 7,785,247; 5,577,899; 7,014,436; 1,129,090; 5,192,198; 1,645,498; 6,447,244; 3,781,141; 5,308,230; and 1,345,655, the entire contents of which are incorporated by reference herein. It should be appreciated that any pump can be used in the disclosed dispenser.

Pump 80 requires a power supply (e.g., a battery or electronics for accepting AC or DC power). The power supply can be housed in any area of the disclosed dispenser. In some embodiments, the power supply is positioned in the same section of the dispenser as the pump. However, the presently disclosed subject matter is not limited and the power supply and pump can be positioned in different areas of the dispenser.

Motor 75 can include any device that converts energy into useful mechanical motion, such as rotation motion, axial motion, radial motion, and the like. The term "motor" therefore broadly includes all classes or motoring and generating machines that convert electrical energy to rotational motion and vice versa. See, for example, U.S. Pat. Nos. 7,834,566; 9,231,459; and 8,714,481, the entire contents of which are hereby incorporated by reference herein.

Figure 10A:
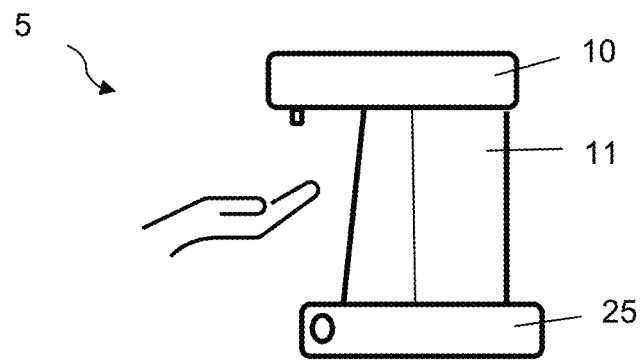
FIGS. 10a-10c are side plan views illustrating a method of using the disclosed dispenser in accordance with some embodiments of the presently disclosed subject matter.
Figure 10B:
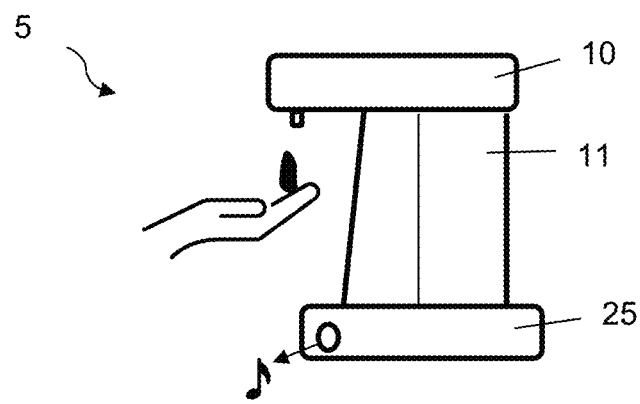
Figure 10C:
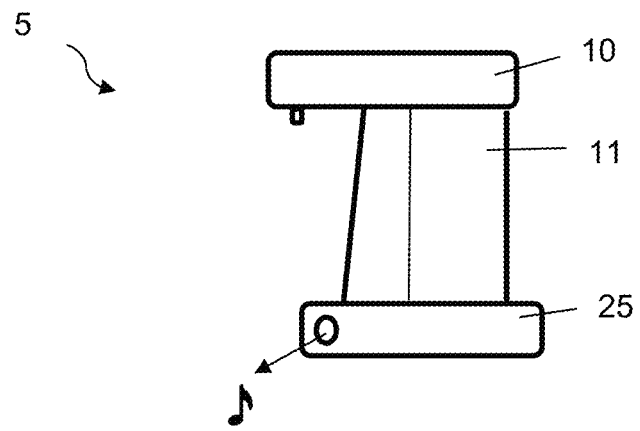

At the same time that the motor controller is receiving the signal from the microcontroller and activating the motor and pump, MP3 module 70 can receive a signal from the microcontroller and is activated, as shown in FIGS. 10*a*-10*c*. Specifically, a random audio file can be selected and played via speakers 50. In some embodiments, the same auditory tone is transmitted each time the sensor is triggered. Alternatively, a pre-determined number of auditory tones can be cycled through or randomly selected each time the sensor is triggered.

In some embodiments, the MP3 files can be stored on a removable micro-SD card or other storage element inside the MP3 module, which allows for the user to easily change the audio file, such as to update the file, recreate in a new language, etc. "MP3" refers to a particular audio compression algorithm and can broadly refer to digital music using any compression algorithm (e.g., AAC). In some embodiments. The MP3 module can include a wireless terminal. The MP3 module allows reproduction of stored digital audio data. Speaker 25 is mounted on the dispenser to receive the audio signal output from the MP3 module and output it to the external environment so a user can hear the auditory tone.

In some embodiments the dispenser can include an audio amplifier to allow for the speaker volume to be amplified and controlled. The audio amplifier can have any desired configuration, such as a knob or dial. In this way, the audio playing can be easily heard by the user. In some embodiments, the product dispensing and the initiation of auditory tone are simultaneous. In other embodiments, there is a 1-10 second delay from the time the sensor is activated until the product is dispensed and/or the auditory tone is initiated (or vice versa).

The auditory tone is emitted from speaker 25 for a pre-determined amount of time. For example, the auditory tone can span an appropriate time for advising the user as to how long they should wash their hands (e.g., at least/no more than about 10, 15, 20, 25, 30, 35, 40, 45, 50, 55, or 60 seconds). However, the presently disclosed subject matter is not limited and the auditory tone can be longer or shorter than the range given herein. After the auditory tone ends and product 16 has been dispensed, the dispenser then transitions to idle mode until the sensor is triggered again by a user.

In some embodiments, an Arduino based code runs the device and lives on the microcontroller, allowing the dispenser to properly function. Arduino is an open-source hardware and software company, project, and user community that designs and manufactures single board microcontrollers and kits for building digital devices. The code does not require any adjustment or activation by the user. However, the code can optionally be adjusted by the user or manufacturer to change the amount of product 16 being dispensed or to change the number of audio files that can be randomly selected and played on the device.

The microcontroller, motor controller, motor pump, MP3 module, and audio amplifier can include a casing or seating within the interior of dispenser 5. In this way, each element can be seated and housed within the dispenser interior. It should be appreciated that the cited elements can be configured in any area of the dispenser interior, such as (but not limited to) adjacent to or on top of the reservoir, adjacent to outlet 45, adjacent to base 25, adjacent to one or more speakers, or any area in between.

Figure 9:
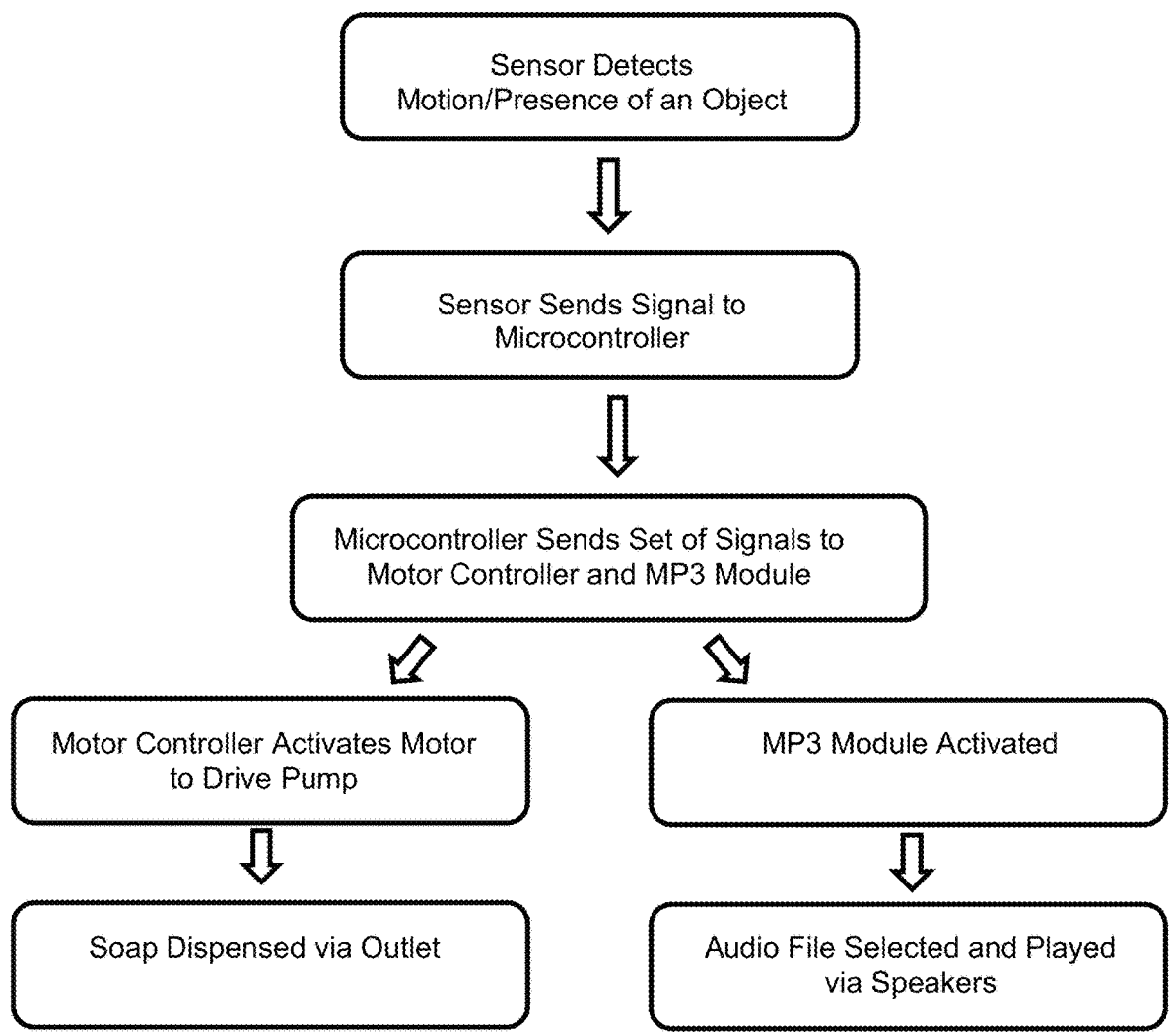
FIG. 9 is a schematic illustrating one embodiment of using the disclosed dispenser.

The schematic of FIG. 9 illustrates one method of activating the dispenser to dispense and play the auditory tone as described above.

Figure 11:
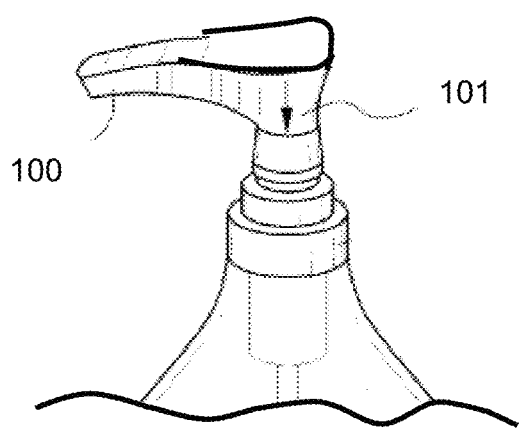
FIG. 11 is an alternate embodiment of a dispenser in accordance with some embodiments of the presently disclosed subject matter.

Although described as being touchless above, the presently disclosed subject matter also includes embodiments wherein the dispenser includes a hand pump feature to allow the user to manually dispense product 16. FIG. 11 illustrates one embodiment of a suitable hand pump that can be used. As shown, the pump feature includes discharge nozzle 100 through which product 16 exits the dispenser. The dispenser also includes an internal pump mechanism as described above. In use, the user is able to displace a small amount of product from the internal reservoir to the dispensing nozzle by pressing down on the nozzle. The nozzle performs like a piston, as it is capable of being pressed down within the pump assembly 101. A spring in the internal pump mechanism forces the discharge nozzle upwards to its original position. As the discharge nozzle ascent, product from the reservoir is down into the suction nozzle. It should be appreciated that any known manual pump mechanism can be used.

The dispenser and any component thereof can be constructed from any desired rigid or semi-rigid material. For example, the items can be constructed from plastic, metal, wood, or combinations thereof. In some embodiments, the housing and base can be constructed from the same material. In other embodiments, one or more elements differ in construction material compared to at least one other.

Any known method can be used to construct dispenser 5. For example, thermoforming, welding, blow-molding, and the like can be used. Such methods are well known in the art.

The disclosed dispenser offers many advantages over the prior art. For example, the sensor is easy to fill and use, even by children or the elderly.

In addition, the auditory tone provides a sense of relaxation to the user, depending on the auditory tone.

In some embodiments, the auditory tone is an indicator of the amount of time a user should allot for finishing a task, such as washing his hands.

The dispenser further provides an automatic, hands-free option for dispensing a product to a user.

Further, when using the disclosed dispenser, product 16 will automatically be released by a sensor that will activate the audible tone. The dispenser therefore encourages, motivates, and uplifts the user when the user is going through a personal challenge or when the user simply desires to enjoy the tone.

While the presently disclosed subject matter has been shown and described above, it will be apparent to those skilled in the art that many modifications, additions, and deletions can be made therein without departing from the spirit and scope of the invention.

What is claimed is:

1. A dispenser comprising:
   a housing defined by a removable inner reservoir; a dispensing outlet; a housing interior that includes a motor, a motor pump, and a conduit that connects the reservoir to the pump and the pump to the dispensing outlet;
   a base operatively connected to a bottom surface of the housing, wherein the base comprises at least one speaker capable of transmitting an auditory tone; and
   a sensor capable of detecting the presence of a user, wherein the sensor is configured to send a signal to a microcontroller that both activates a motor controller to dispense a predetermined amount of product housed within the inner reservoir when the presence of a user is detected, and activates a digital tone module to transmit the auditory tone from the speaker when the presence of the user is detected, whereby the sensor activates both dispensing of the predetermined amount of product and initiation of the auditory tone from the speaker;
   wherein the housing includes a lip opposite from the inner reservoir, the lip extending beyond the base; and
   wherein the dispensing outlet and sensor are configured on a lower face of the lip.

2. The dispenser of claim 1 wherein the auditory tone is selected from music, quotes, Scripture, jokes, short stories, passages from the King James Bible, or combinations thereof.

3. The dispenser of claim 1, wherein the sensor and dispensing outlet are positioned on the lower face of the housing lip at a distance of about 0.1-1 inches apart.

4. The dispenser of claim 1, wherein a top surface of the housing includes an access operably connected to the inner reservoir.

5. The dispenser of claim 1, wherein the sensor is selected from a motion sensor, infrared sensor, or heat sensor.

6. The dispenser of claim 1, wherein the speakers are positioned beneath the base.

7. The dispenser of claim 1, wherein the digital tone module is an MP3 module.

8. The dispenser of claim 1, wherein the microcontroller is configured to simultaneously send signals to the motor controller and the digital tone module.

9. The dispenser of claim 1, wherein the motor controller activates the motor to drive the pump to dispense a product housed within the reservoir.

10. The dispenser of claim 1, wherein the digital tone module is configured to play a random audio tone when the sensor is triggered.

11. The dispenser of claim 1, wherein the digital audio tone is stored on a removable micro-SD card.

12. The dispenser of claim 1, further comprising an audio amplifier.

13. A method of simultaneously dispensing a product and transmitting an auditory tone from a dispenser upon triggering of a dispenser sensor, the method comprising:
    positioning an object to be detected by the sensor of the dispenser of claim 1 to trigger the sensor;

dispensing a pre-determined amount of product from the outlet;
simultaneously emitting an auditory tone from the at least one speaker;
wherein the auditory tone lasts for a pre-determined amount of time.

14. The method of claim 13, wherein the auditory tone is randomly selected from a number of different auditory tones.

15. The method of claim 13, wherein the auditory tone is selected from music, quotes, Scripture, jokes, short stories, passages from the King James Bible, or combinations thereof.

16. The method of claim 13, wherein the at least one speaker is positioned beneath the dispenser base.

17. The method of claim 13, wherein the microcontroller simultaneously sends signals to the motor controller and the digital tone module.

18. The method of claim 13, wherein, wherein the digital tone module is configured to play a random audio tone when the sensor is triggered.

* * * * *